(12) United States Patent
Kitamura

(10) Patent No.: US 6,859,895 B2
(45) Date of Patent: Feb. 22, 2005

(54) METHOD OF MONITORING LIFE-OR-DEATH STATE OF HOST COMPUTER CONNECTED TO NETWORK AND LIFE-AND-DEATH MONITORING SYSTEM

(75) Inventor: Toshikazu Kitamura, Tokyo (JP)

(73) Assignee: NEC Corporation, Tokyo (JP)

( * ) Notice: Subject to any disclaimer, the term of this patent is extended or adjusted under 35 U.S.C. 154(b) by 424 days.

(21) Appl. No.: 10/043,170

(22) Filed: Jan. 14, 2002

(65) Prior Publication Data

US 2002/0095627 A1 Jul. 18, 2002

(30) Foreign Application Priority Data

Jan. 15, 2001 (JP) ........................................ 2001-006773

(51) Int. Cl.[7] .............................................. G06F 11/00
(52) U.S. Cl. ........................................ 714/43; 709/224
(58) Field of Search ............................. 714/43, 44, 51, 714/55; 709/223, 224, 227, 229, 200

(56) References Cited

U.S. PATENT DOCUMENTS

| | | | | |
|---|---|---|---|---|
| 5,351,242 A | * | 9/1994 | Kramarczyk et al. | ....... 370/434 |
| 5,701,484 A | * | 12/1997 | Artsy | .......................... 719/316 |
| 5,931,916 A | * | 8/1999 | Barker et al. | ................ 709/239 |
| 6,343,320 B1 | * | 1/2002 | Fairchild et al. | ............. 709/224 |
| 6,574,197 B1 | * | 6/2003 | Kanamaru et al. | ........... 370/252 |

* cited by examiner

Primary Examiner—Dieu-Minh Le
(74) Attorney, Agent, or Firm—Sughrue Mion, PLLC

(57) ABSTRACT

According to the life-and-death monitoring method of monitoring, by any of a plurality of host computers connected to a common network, a life-or-death state of other host computer, a life-and-death monitoring packet including a table having a management order of a host computer to be managed, and an address and a check flag of the host computer is transmitted from a management host computer to any of the host computers to be managed, the host computer to be managed which has received the life-and-death monitoring packet checks a check flag of the table in which its own address is registered, and the host computer to be managed which has completed the checking transmits the life-and-death monitoring packet to a subsequent host computer to be managed according to the management order of the table.

17 Claims, 5 Drawing Sheets

LIFE-AND-DEATH MONITORING ORDER

METHOD OF MONITORING LIFE-OR-DEATH STATE OF HOST COMPUTER CONNECTED TO NETWORK AND LIFE-AND-DEATH MONITORING SYSTEM

BACKGROUND OF THE INVENTION

1. Field of the Invention

The present invention relates to a method of monitoring a life-or-death state of a host computer connected to a network intended to confirm a life-or-death state of a plurality of host computers connected to the network, a life-and-death monitoring system and a computer program suitable for the system and, more particularly, to the monitoring of a life-or-death state of a host computer to be managed which is realized by sequential transfer of a life-and-death monitoring packet.

2. Description of the Related Art

There is a conventional method of conducting communication with a plurality of host computers connected to a communication network. In such a case of communication with a plurality of host computers connected, it is necessary to check whether each host computer is communicable, that is, it is dead or alive.

In the following, description will be made of a life-and-death monitoring method at a conventional life-and-death monitoring system with a plurality of host computers connected to a network.

As shown in FIG. 5, for example, in a case of transmission with a management host computer A and to-be-managed host computers B, C and D connected through a network 100, the management host computer A for managing these host computers B, C and D to be managed sends a life-and-death monitoring packet to all of the host computers B, C and D to be managed and receives a response returned from the life-and-death monitoring packet, thereby realizing transmission.

In such a case where the number of host computers to be managed is small as mentioned above, transmission and response between the management host computer A and the host computers B, C and D to be managed is conducted smoothly. However, in a case where the number of host computers to be managed is large, for example, where a number N of host computers to be managed are provided, life-or-death state monitoring results in having a maximum number N of life-and-death monitoring packets at a time on the network. Existence of such a large number of life-and-death monitoring packets contributes to an increase in the load on the network and hinders communication.

At the same time, the management host computer needs to transmit a life-and-death monitoring packet to each of the number N of host computers to check its life-or-death state, which results in an increase in the load on the management host computer itself.

SUMMARY OF THE INVENTION

Under these circumstances, an object of the present invention is to provide a method of monitoring a life-or-death state of a host computer connected to a network which enables reduction in the load on the network by minimizing the number of life-and-death monitoring packets existing on the network.

According to one aspect of the invention, a life-and-death monitoring method of monitoring, by any of a plurality of host computers connected to a common network, a life-or-death state of other host computer, comprising the steps of a step of transmitting a life-and-death monitoring packet including a table having a management order of a host computer to be managed, and an address and a check flag of said host computer from a management host computer to any of said host computers to be managed, a step, by said host computer to be managed which has received said life-and-death monitoring packet, of checking a check flag of said table in which the address of said host computer is registered, and a step, by said host computer to be managed which has completed said checking, of transmitting said life-and-death monitoring packet to a subsequent host computer to be managed according to said management order of said table.

In the preferred construction, when said host computer to be managed which have completed said checking and will transmit said life-and-death monitoring packet to a subsequent host computer to be managed according to said management order recognizes in advance that said host computer to be managed which comes next in the management order is incommunicable, said life-and-death monitoring packet is transmitted to a further subsequently registered communicable host computer to be managed without sending the packet to the incommunicable host computer to be managed in question.

In another preferred construction, when there exist a plurality of said host computers to be managed which are recognized as incommunicable, said life-and-death monitoring packet is transmitted to said host computer to be managed which comes further subsequently in the order to the plurality of incommunicable host computers to be managed in question.

In another preferred construction, at the end of the management order of said table in said life-and-death monitoring packet, an address of said management host computer is registered, so that said life-and-death monitoring packet which has been transmitted in said management order is lastly transmitted to said management host computer.

In another preferred construction, said management host computer having received said life-and-death monitoring packet generates said life-and-death monitoring packet including said table targeted at said host computer to be managed whose check flag of said table is not checked and transmits said packet to said host computer to be managed whose flag is not checked.

In another preferred construction, when said life-and-death monitoring packet is not returned to said management host computer, a new life-and-death monitoring packet is generated by changing the management order of said table in said life-and-death monitoring packet and transmitted.

According to another aspect of the invention, a life-and-death monitoring system at a plurality of host computers connected to a common network, comprises a host computer to be managed and a management host computer for checking a life-or-death state of the host computer to be managed in question, wherein said management host computer transmits a life-and-death monitoring packet including a table having a management order of said host computer to be managed, and an address and a check flag of said host computer to any of said host computers to be managed, and said host computer to be managed which has received said life-and-death monitoring packet checks a check flag of said table in which the address of said host computer is registered and said host computer to be managed which has completed said checking transmits said life-and-death monitoring packet to a subsequent host computer to be managed according to said management order of said table.

In the preferred construction, when said host computer to be managed which have completed said checking and will transmit said life-and-death monitoring packet to a subsequent host computer to be managed according to said management order recognizes in advance that said host computer to be managed which comes next in the management order is incommunicable, said life-and-death monitoring packet is transmitted to a further subsequently registered communicable host computer to be managed without sending the packet to the incommunicable host computer to be managed in question.

In another preferred construction, when there exist a plurality of said host computers to be managed which are recognized as incommunicable, said life-and-death monitoring packet is transmitted to said host computer to be managed which comes further subsequently in the order to the plurality of incommunicable host computers to be managed in question.

In another preferred construction, at the end of the management order of said table in said life-and-death monitoring packet, an address of said management host computer is registered, so that said life-and-death monitoring packet which has been transmitted in said management order is lastly transmitted to said management host computer.

In another preferred construction, said management host computer having received said life-and-death monitoring packet generates said life-and-death monitoring packet including said table targeted at said host computer to be managed whose check flag of said table is not checked and transmits said packet to said host computer to be managed whose flag is not checked.

In another preferred construction, when said life-and-death monitoring packet is not returned to said management host computer, said management host computer generates a new life-and-death monitoring packet by changing the management order of said table in said life-and-death monitoring packet and transmits the generated packet.

According to a further aspect of the invention, a life-and-death monitoring computer program for use in monitoring, by any of a plurality of host computers connected to a common network, a life-or-death state of other host computer, comprising the functions of transmitting a life-and-death monitoring packet including a table having a management order of a host computer to be managed, and an address and a check flag of said host computer from a management host computer to any of said host computers to be managed, at said host computer to be managed which has received said life-and-death monitoring packet, checking a check flag of said table in which the address of said host computer is registered, and at said host computer to be managed which has completed said checking, transmitting said life-and-death monitoring packet to a subsequent host computer to be managed according to said management order of said table.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

The present invention is directed to the monitoring of a life-or-death state of a host computer to be managed which is realized by transmission and reception of a life-and-death monitoring packet uniquely defined for monitoring a life-or-death state between a management host computer and the host computer to be managed which are connected to a common network.

Figure 1:
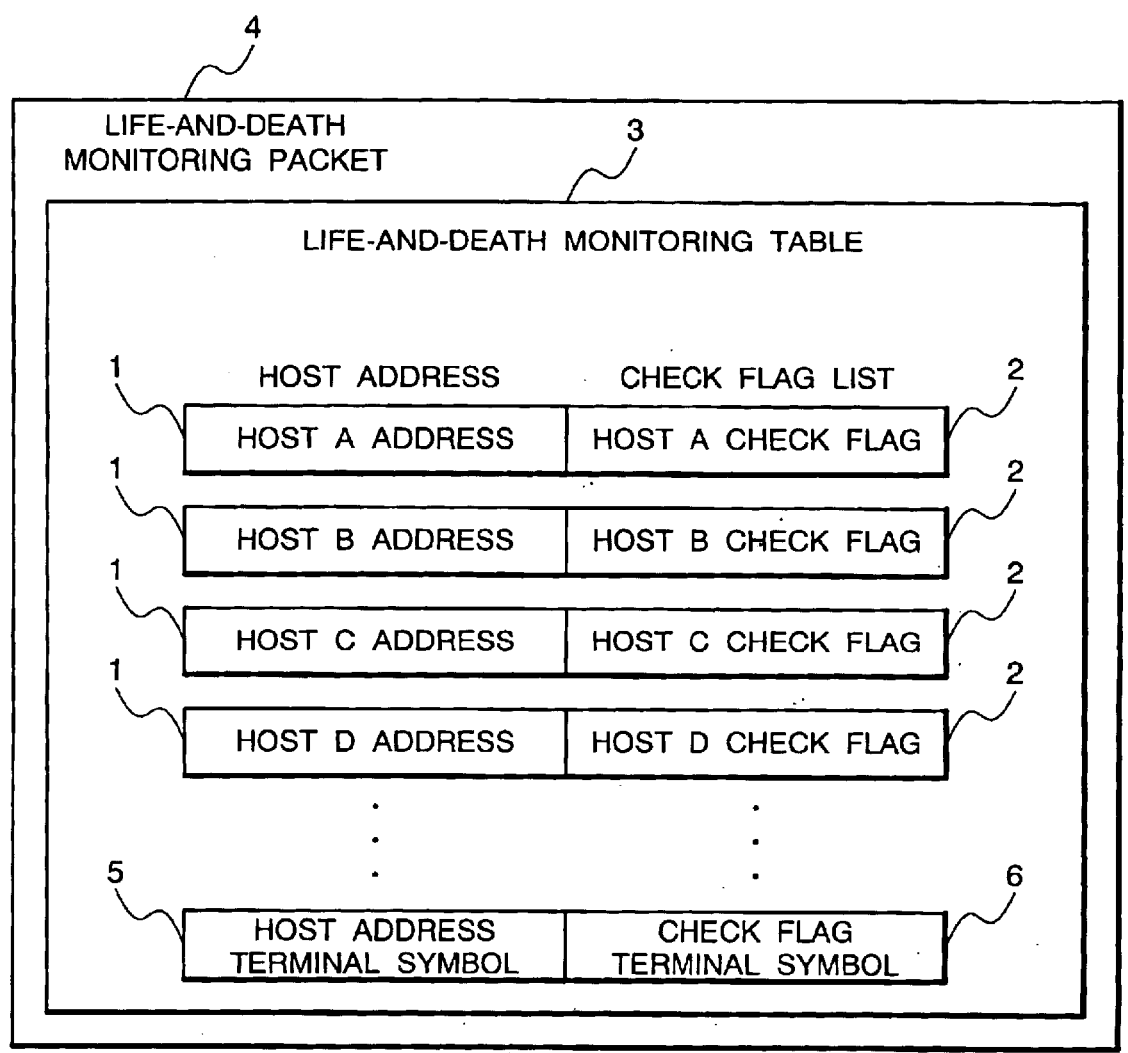
FIG. 1 is a diagram for use in explaining a life-and-death monitoring packet in one embodiment of a method of monitoring a life-or-death state of a host computer connected to a network according to the present invention.

As shown in FIG. 1, assume that a life-and-death monitoring packet 4 includes a life-and-death monitoring table 3 having a host address 1 in which an address of a host computer is stored and a check flag list 2.

Stored in the order of reception at the host address 1 in the life-and-death monitoring table 3 of the life-and-death monitoring packet 4 are addresses of a host computer to be managed and a management host computer which receive the life-and-death monitoring packet 4 in question. A host computer to be managed which has received the life-and-death monitoring packet 4 searches the host address 1 of the life-and-death monitoring packet 4 for its own address and sets a check flag corresponding to the searched address. After the setting, the computer in question transmits the life-and-death monitoring packet 4 to the address 1 of a host computer to be managed which is registered subsequently to its own address in question.

Stored at the end of the life-and-death monitoring table 3 are a host address terminal symbol 5 and a check flag terminal symbol 6 indicative of the end of the monitoring table.

Next, in a case where it is found in advance that a registered host computer to be managed is not at a receptionenabled state, the host computer in question transmits the packet to the address 1 of a host computer to be managed which is registered subsequently to the reception-disabled host computer. When the subsequent host computer to be managed is found to be incommunicable in advance, the life-and-death monitoring packet 4 will be transmitted to the address 1 of a host computer to be managed which seems to be communicable thereafter in turn.

Figure 2:
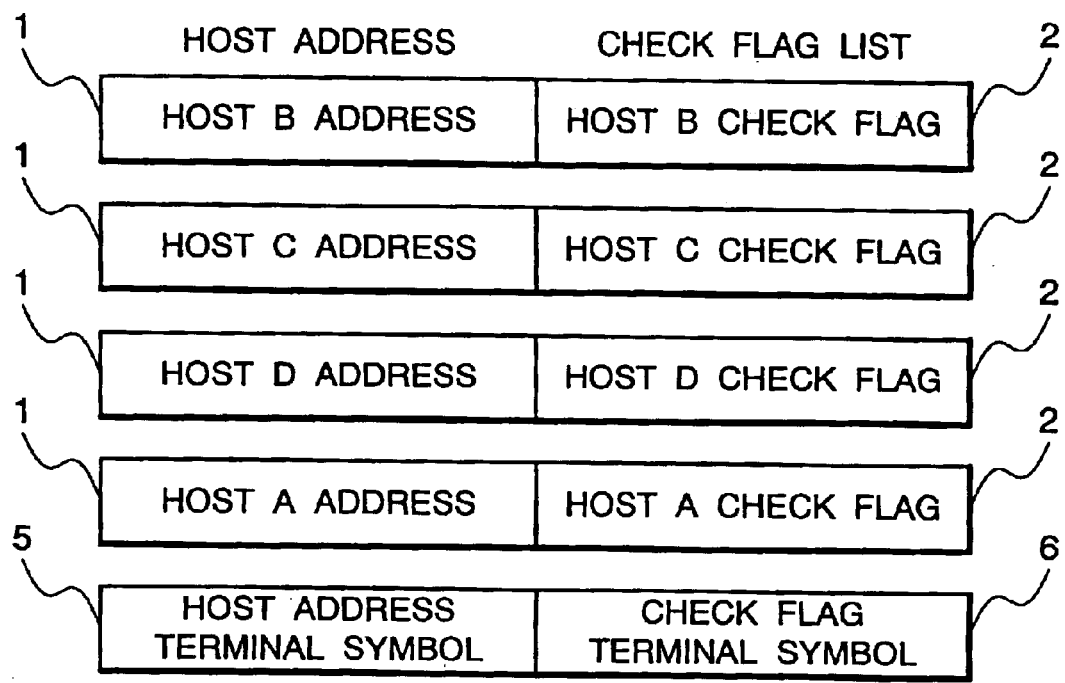
FIG. 2 is a diagram for use in explaining an order in which a life-or-death state of host computers to be managed is monitored in one embodiment of the method of monitoring a life-or-death state of a host computer connected to a network according to the present invention.
Figure 5:
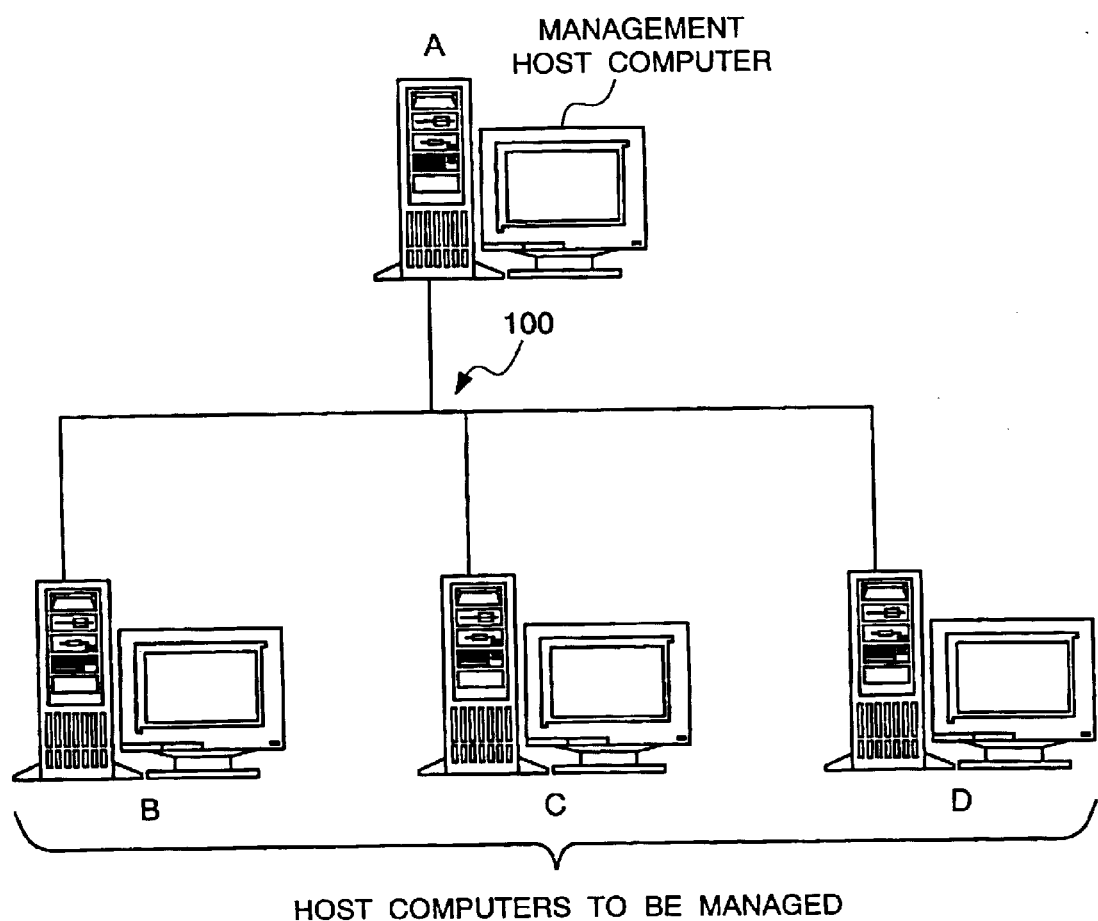
FIG. 5 is a diagram for use in explaining a conventional life-or-death state monitoring method.

Next, description will be made of operation of the embodiment of the present invention. FIG. 2 is a diagram for use in explaining application of the present invention to such a system environment made up of the management host computer A for monitoring a life-or-death state and host computers B, C and D to be managed whose life-or-death state is to be monitored as shown in FIG. 5.

The management host computer A for monitoring a life-or-death state of a plurality of host computers to be managed determines an order of management of the plurality of host computers B, C and D to be managed in advance. Here, assume that the management is conducted in the order of B, C and D.

The management host computer A creates a host list in such an order as shown in FIG. 2 and transmits the life-and-death monitoring packet 4 including the life-and-death monitoring table 3 to the host computer to be managed. In the host list of the life-and-death monitoring table 3, the address of the management host computer A is stored which lastly receives the life-and-death monitoring packet 4 having been transmitted to the host computers B, C and D to be managed in this order.

Figure 3:
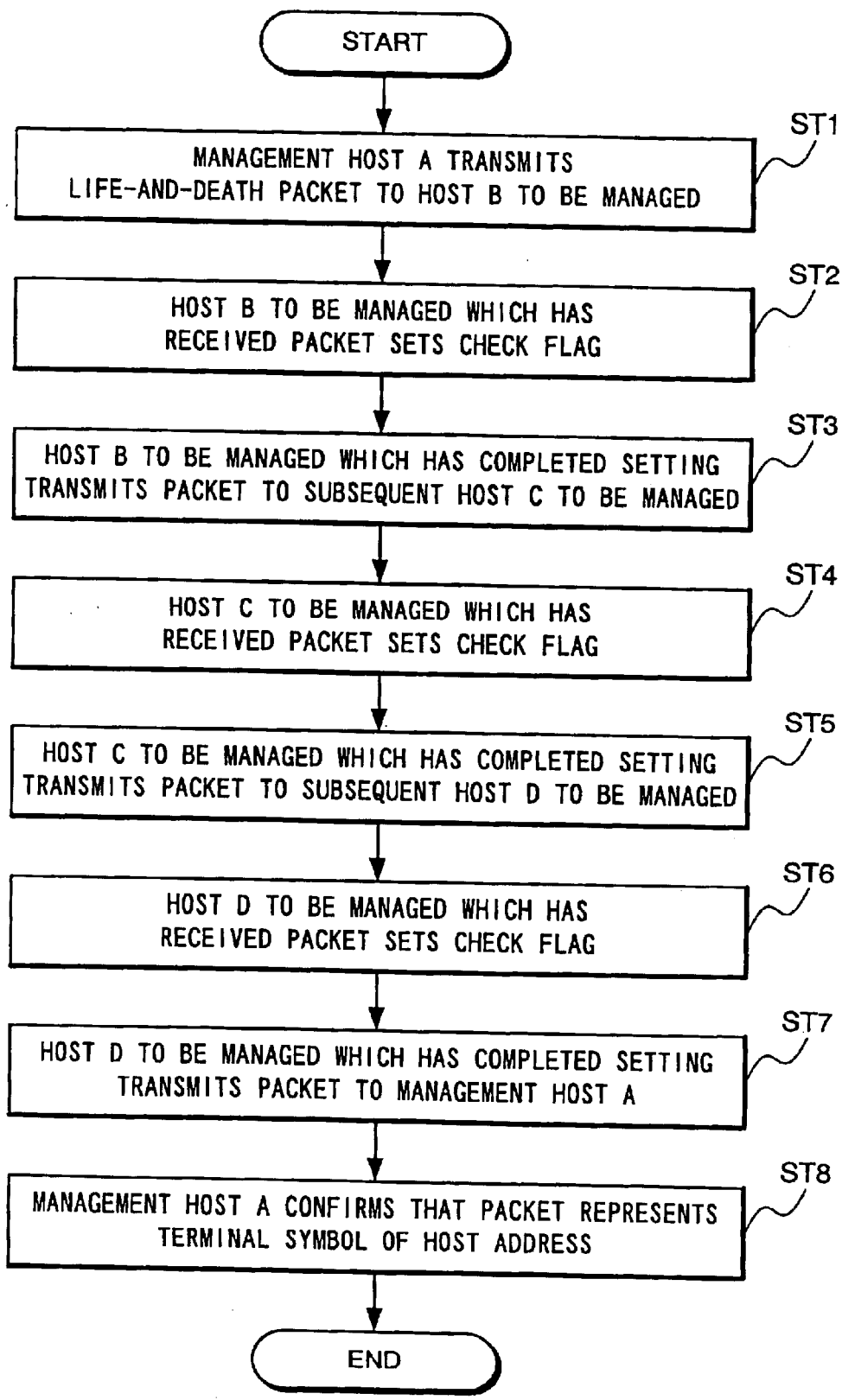
FIG. 3 is a flow chart for use in explaining a life-or-death state monitoring method in one embodiment of the method of monitoring a life-or-death state of a host computer connected to a network according to the present invention.

Method of transmitting the life-and-death monitoring packet 4 will be described with reference to the flow chart shown in FIG. 3.

The management host computer A creates a host list in such an order as shown in FIG. 2 to transmit the life-and-death monitoring packet 4 to the host computer B to be managed (Step ST1). Upon receiving the life-and-death monitoring packet 4 transmitted from the management host computer A, the host computer B to be managed sets a check flag 1 corresponding to its own address in the host list (Step ST2). Upon completion of the setting, the host computer B to be managed transmits the life-and-death monitoring packet 4 to the subsequent host computer C to be managed (Step ST3).

Upon receiving the life-and-death monitoring packet 4 transmitted from the host computer B to be managed, the host computer C to be managed sets a check flag corresponding to its own address in the host list (Step ST4). Upon completion of the setting, the host computer C to be managed transmits the life-and-death monitoring packet 4 to the subsequent host computer D to be managed (Step ST5).

Upon receiving the life-and-death monitoring packet 4 transmitted from the host computer C to be managed, the host computer D to be managed sets a check flag corresponding to its own address in the host list (Step ST6). Upon completion of the setting, the host computer C to be managed transmits the life-and-death monitoring packet 4 to the management host computer A (Step ST7).

The management host computer A having lastly received the life-and-death monitoring packet 4 which has been transmitted in such an order of B, C, D and A as described above confirms that the subsequent transmission address is "host address terminal symbol" (Step ST8). As a result, transmission of the life-and-death monitoring packet 4 ends.

Figure 4:
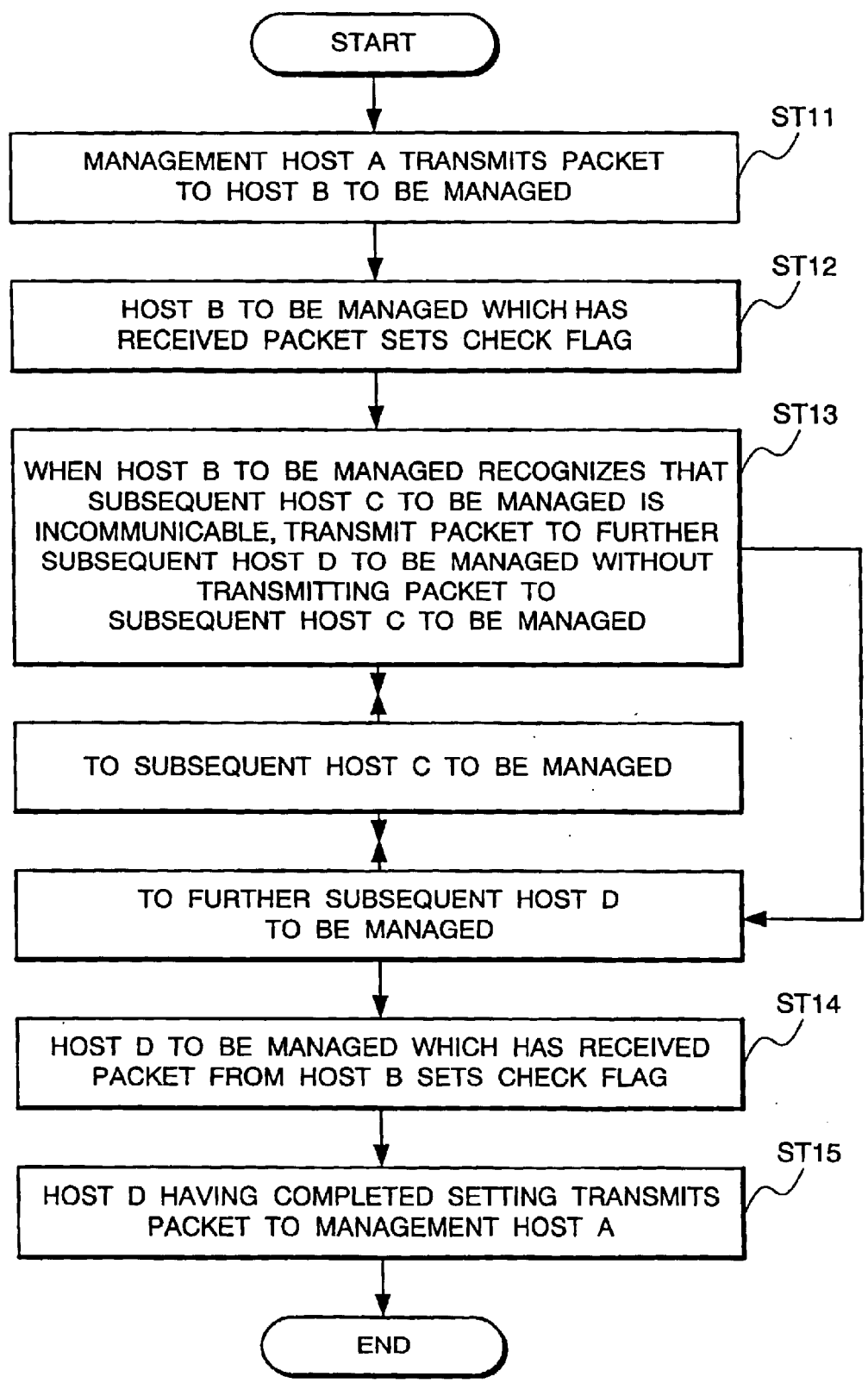
FIG. 4 is a flow chart for use in explaining another life-or-death state monitoring method in one embodiment of the method of monitoring a life-or-death state of a host computer connected to a network according to the present invention.

Shown in FIG. 4 is a flow chart of a program for use in explaining a case where some of a plurality of host computers to be managed are incommunicable. Description of the flow chart will be made in the following.

The management host computer A creates a host list in the order shown in FIG. 2 and transmits the life-and-death monitoring packet 4 to the host computer B to be managed (Step ST11). Upon receiving the life-and-death monitoring packet 4 transmitted from the management host computer A, the host computer B to be managed sets the check flag 1 corresponding to its own address in the host list (Step ST12). When the host computer B to be managed finds in advance that the host computer C to be managed to which the life-and-death monitoring packet 4 is to be sent next is incommunicable, the host computer B to be managed transmits the life-and-death monitoring packet 4 not to the subsequent host computer C to be managed but to a further subsequent host computer D to be managed with which communication can be normally conducted (Step ST13).

Upon receiving the life-and-death monitoring packet 4 transmitted from the host computer B to be managed, the host computer D to be managed sets the check flag 1 corresponding to its own address in the host list (Step ST14). Upon completing the setting, the host computer D to be managed transmits the life-and-death monitoring packet 4 to the management host computer A (Step ST15).

The management host computer A having lastly received the life-and-death monitoring packet 4 which had been transmitted in the order of B, C, D and A confirms that the subsequent transmission address is "host address terminal symbol".

Since a host computer to be managed whose check flag is not set is assumed not to be functioning by the confirmation, further create a list having only the host computer to be managed which is assumed not to be functioning and generate a new life-and-death monitoring packet, which realizes another transmission of the life-and-death monitoring packet 4.

In a case where there exist a plurality of incommunicable host computers to be managed, that is, where the host computers C and D to be managed are not communicable, communicate with a further subsequent host computer E to be managed (not shown).

As described in the foregoing, when the management host computer A for monitoring a life-or-death state transmits the life-and-death monitoring packet 4 in which its own address is stored at the end of the entry to a first host computer to be managed as a target of monitoring and host computers to be managed transmit the life-and-death monitoring packet 4 in turn, the life-and-death monitoring packet 4 exists only one at a time on the network to reduce the load on the network.

In addition, since the management host computer A only needs to transmit the life-and-death monitoring packet 4 to the host computer B to be managed at first, the load on the management host computer A is minimized.

When the life-and-death monitoring packet 4 is not returned to the management host computer A, by transmitting a new life-and-death monitoring packet whose registered combination of host computers to be managed (i.e. management order) is changed, it is possible to find at which host computer to be managed the life-and-death monitoring packet 4 stops.

The life-and-death monitoring system of the present embodiment can be implemented by loading a computer program having the above-described functions into a memory of a computer processing device. The computer program is stored in a magnetic disc, a semiconductor memory or other recording medium (reference number).

Then, loading the program from the recording medium into the computer processing device to control operation of the computer processing device realizes each of the above-described functions.

As described in the foregoing, since the present invention provides the method of sequentially transferring a life-and-death monitoring packet having a combination of an address and a check flag to a plurality of host computers to be managed, as compared with a conventional method requiring a number N of life-and-death monitoring packets in order to monitor a life-or-death state of a number N of host computers to be managed, the number of life-and-death monitoring packets existing on a network can be minimized to reduce the load on the network as a result.

In addition, since a management host computer only needs to transmit one life-and-death monitoring packet and wait for the life-and-death monitoring packet having traveled around registered host computers to be managed to return, the load on the management host computer itself can be mitigated.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A life-and-death monitoring method of monitoring a plurality of host computers connected to a common network, said method comprising:

transmitting a life-and-death monitoring packet comprising a table having a management order of a host computer to be managed, and an address and a check flag of said host computer from a management host computer to any of said host computers to be managed;

when said host computer to be managed has received said life-and-death monitoring packet, checking a check flag of said table in which the address of said host computer is registered; and when said host computer to be managed has completed said checking, transmitting said life-and-death monitoring packet to a subsequent host computer to be managed according to said management order of said table.

2. The life-and-death monitoring method as set forth in claim 1, wherein when said host computer to be managed has completed said checking and, prior to transmitting said life-and-death monitoring packet to a subsequent host computer to be managed according to said management order, recognizes in advance that said subsequent host computer to be managed is incommunicable, said life-and-death monitoring packet is transmitted to a further subsequently registered communicable host computer to be managed without sending the packet to the incommunicable host computer to be managed in question.

3. The life-and-death monitoring method as set forth in claim 2, wherein when there exist a plurality of said host computers to ie managed which are recognized as incommunicable, said life-and-death monitoring packet is transmitted to said host computer to be managed which comes further subsequently in the order to the plurality of incommunicable host computers to be managed in question.

4. The life-and-death monitoring method as set forth in claim 1, wherein at the end of the management order of said table in said life-and-death monitoring packet, an address of said management host computer is registered, so that said life-and-death monitoring packet which has been transmitted in said management order is lastly transmitted to said management host computer.

5. The life-and-death monitoring method as set forth in claim 1, wherein said management host computer having received said life-and-death monitoring packet generates said life-and-death monitoring packet including said table targeted at said host computer to be managed whose check flag of said table is not checked and transmits said packet to said host computer to be managed whose flag is not checked.

6. The life-and-death monitoring method according to claim 1, wherein when said life-and-death monitoring packet is not returned to said management host computer, a new life-and-death monitoring packet is generated by changing the management order of said table in said life-and-death monitoring packet and transmitted.

7. A life-and-death monitoring system for a plurality of host computers connected to a common network, comprising:

a host computer to be managed and a management host computer for checking a life-or-death state of the host computer to be managed in question, wherein said management host computer transmits a life-and-death monitoring packet comprising a table having a management order of said host computer to be managed, and an address and a check flag of said host computer to any of said host computers to be managed, and said host computer to be managed that has received said life-and-death monitoring packet checks a check flag of said table in which the address of said host computer is registered and said host computer to be managed that has completed said checking transmits said life-and-death monitoring packet to a subsequent host computer to be managed according to said management order of said table.

8. The life-and-death monitoring system as set forth in claim 7, wherein when said host computer to be managed has completed said checking and, prior to transmitting said life-and-death monitoring packet to a subsequent host computer to be managed according to said management order, recognizes in advance that said subsequent host computer to be managed is incommunicable, said life-and-death monitoring packet is transmitted to a further subsequently registered communicable host computer to be managed without sending the packet to the incommunicable host computer to be managed in question.

9. The life-and-death monitoring system as set forth in claim 8, wherein when there exist a plurality of said host computers to be managed which are recognized as incommunicable, said life-and-death monitoring packet is transmitted to said host computer to be managed which comes further subsequently in the order to the plurality of incommunicable host computers to be managed in question.

10. The life-and-death monitoring system as set forth in claim 7, wherein at the end of the management order of said table in said life-and-death monitoring packet, an address of said management host computer is registered, so that said life-and-death monitoring packet which has been transmitted in said management order is lastly transmitted to said management host computer.

11. The life-and-death monitoring system as set forth in claim 7, wherein said management host computer having received said life-and-death monitoring packet generates said life-and-death monitoring packet comprising said table targeted at said host computer to be managed whose check flag of said table is not checked and transmits said packet to said host computer to be managed whose flag is not checked.

12. The life-and-death monitoring system as set forth in claim 7, wherein when said life-and-death monitoring packet is not returned to said management host computer, said management host computer generates a new life-and-death monitoring packet by changing the management order of said table in said life-and-death monitoring packet and transmits the generated packet.

13. A life-and-death monitoring computer program for use in monitoring a plurality of host computers connected to a common network, said computer program comprising the functions of:

transmitting a life-and-death monitoring packet comprising a table having a management order of a host computer to be managed, and an address and a check flag of said host computer from a management host computer to any of said host computers to be managed, at said host computer to be managed that has received said life-and-death monitoring packet, checking a check flag of said table in which the address of said host computer is registered, and at said host computer to be managed that has completed said checking, transmitting said life-and-death monitoring packet to a subsequent host computer to be managed according to said management order of said table.

14. The life-and-death monitoring computer program as set forth in claim 13, further comprising the function of, when said host computer to be managed has completed said checking, and prior to transmitting said life-and-death monitoring packet to a subsequent host computer to be managed according to said management order, recognizes in advance that said subsequent host computer to be managed is incommunicable, transmitting said life-and-death monitoring packet to a further subsequently registered communicable host computer to be managed without sending the packet to the incommunicable host computer to be managed in question.

15. The life-and-death monitoring computer program as set forth in claim 14, further comprising the function of, when there exist a plurality of said host computers to be managed which are recognized as incommunicable, transmitting said life-and-death monitoring packet to said host computer to be managed which comes further subsequently in the order to the plurality of incommunicable host computers to be managed in question.

16. The life-and-death monitoring computer program as set forth in claim 13, wherein said management host computer having received said life-and-death monitoring packet has the function of generating said life-and-death monitoring packet comprising said table targeted at said host computer to be managed whose check flag of said table is not checked and transmitting said packet to said host computer to be managed whose flag is not checked.

17. The life-and-death monitoring computer program as set forth in claim 13, further comprising the function of, when said life-and-death monitoring packet is not returned to said management host computer, generating a new life-and-death monitoring packet by changing the management order of said table in said life-and-death monitoring packet and transmitting the generated packet.

* * * * *